(12) United States Patent
Fleetwood et al.

(10) Patent No.: US 10,124,510 B2
(45) Date of Patent: Nov. 13, 2018

(54) CONCRETE/MASONRY CUTTING DEVICE WITH FAST-START DESIGN AND INTERLOCKING REINFORCEMENT

(71) Applicant: HUSQVARNA AB, Huskvarna (SE)

(72) Inventors: Jon Fleetwood, Blythewood, SC (US); John Siva, Columbia, SC (US)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 15/525,144

(22) PCT Filed: Nov. 12, 2014

(86) PCT No.: PCT/US2014/065120
§ 371 (c)(1),
(2) Date: May 8, 2017

(87) PCT Pub. No.: WO2016/076843
PCT Pub. Date: May 19, 2016

(65) Prior Publication Data
US 2018/0071956 A1 Mar. 15, 2018

(51) Int. Cl.
B28D 1/12 (2006.01)
B24D 5/12 (2006.01)
B28D 1/04 (2006.01)
B23D 65/00 (2006.01)

(52) U.S. Cl.
CPC ............ B28D 1/121 (2013.01); B28D 1/041 (2013.01); B28D 1/045 (2013.01); B23D 65/00 (2013.01)

(58) Field of Classification Search
CPC .......... B28D 1/121; B28D 1/12; B24D 5/123; B24D 5/12

USPC .................... 451/541, 548, 542, 543; 125/15
See application file for complete search history.

(56) References Cited

U.S. PATENT DOCUMENTS

| | | | | |
|---|---|---|---|---|
| 6,752,709 | B1* | 6/2004 | Skibo | B23C 5/06 125/15 |
| 2006/0130823 | A1* | 6/2006 | Kim | B23D 61/023 125/15 |
| 2007/0144510 | A1* | 6/2007 | Lee | B23D 61/04 125/22 |

OTHER PUBLICATIONS

International Search Report and Written Opinion for International Application No. PCT/US2014/065120 dated Jul. 6, 2015.

(Continued)

Primary Examiner — Robert Rose
(74) Attorney, Agent, or Firm — McNair Law Firm, P.A.

(57) ABSTRACT

A diamond cutting tool (200; 200') for enabling a fast cutting start may include a rotatable main body (210) and a cutting portion (220). The rotatable main body may include a substantially circular periphery. The cutting portion may include an interlocking support assembly (280) and a plurality of notched cutters (270). The notched cutters may be disposed around the circular periphery extending outwardly from the main body. The notched cutters (270) may be formed of a first diamond-metal matrix. The interlocking support assembly (280) may be provided radially outwardly of the notched cutters and may include a softer diamond-metal matrix and/or a different diamond concentration therein than the first diamond-metal matrix. The interlocking support assembly may include a reinforcement portion (284) disposed between the notched cutters (270) and a top section (282) covering radially distal portions of the notched cutters.

20 Claims, 5 Drawing Sheets

(56) References Cited

OTHER PUBLICATIONS

International Preliminary Report on Patentability for International Application No. PCT/US2014/065120 dated Feb. 27, 2017.

* cited by examiner

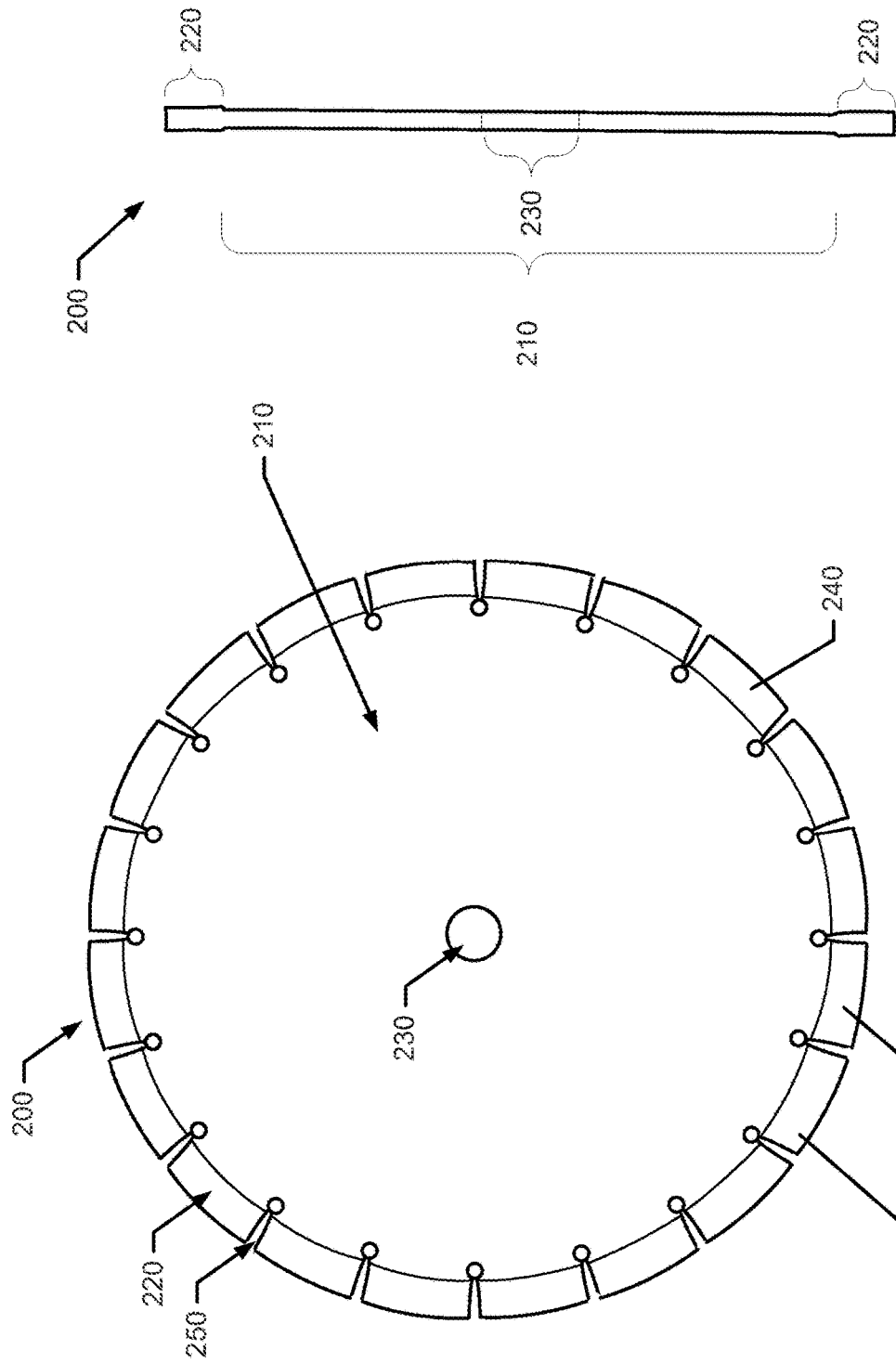

FIG. 5A
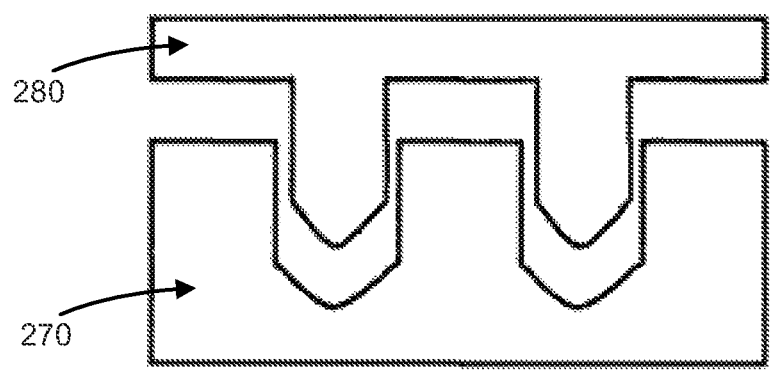
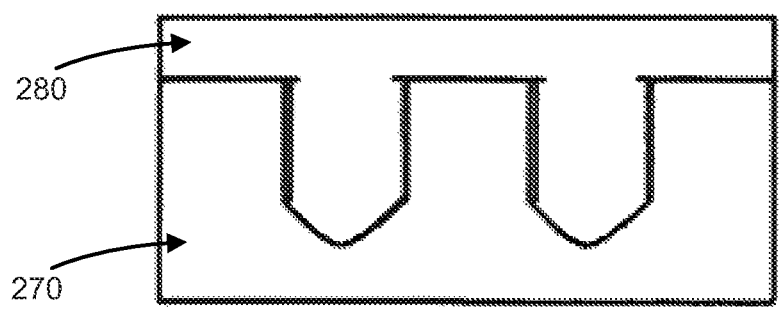
FIG. 5B

CONCRETE/MASONRY CUTTING DEVICE WITH FAST-START DESIGN AND INTERLOCKING REINFORCEMENT

TECHNICAL FIELD

Example embodiments relate to cutting devices that are appropriate for cutting hard materials such as concrete, masonry or stone and more particularly relate to a saw blade and core bit configured to enable fast starting by providing an interlocking design of reinforcement portions and a fast-start cutting portion.

BACKGROUND OF THE INVENTION

Concrete and other hard materials are often cut with cutting devices that employ a cutting section made with diamond-metal matrix. These cutting portions can have single or multi-layer diamond sections side by side, with or without a backing pad. In some cases, they may employ either a top that has straight or relatively smooth curved radius segments made of a single material. As an alternative, some designs provide notches, wavy tops, indented turbo sides or other such features in the segments.

When a standard straight segment is used, a relatively slow cutting speed must typically be employed relative to a notched segment design in which a certain percentage of diamond section material is removed to reduce factional drag. However, such notched designs are often weaker in strength due to the removal of material. Thus, the notched segments can sometimes break.

Thus, improvements in cutting device design may be warranted.

BRIEF DISCLOSURE OF THE INVENTION

To provide a saw blade and core bit that is capable of making cuts at a high speed, but without significantly increasing the risk of damaging or breaking the saw blade/core bit segments, some example embodiments may employ a plurality of notched cutting segments having reinforcement for the notches and a soft and/or lower diamond concentration matrix of materials to cover the notches and reinforced portions.

In accordance with an example embodiment, a diamond cutting tool for enabling a fast cutting start may include a rotatable main body and a cutting portion. The rotatable main body may include a substantially circular periphery. The cutting portion may include an interlocking support assembly and a plurality of notched cutters. The notched cutters may be disposed around the circular periphery extending outwardly from the main body. The notched cutters may be formed of a first diamond-metal matrix. The interlocking support assembly may be provided radially outwardly of the notched cutters and may include a softer diamond-metal matrix and/or a different diamond concentration therein than the first diamond-metal matrix. The interlocking support assembly may include a reinforcement portion disposed between the notched cutters and a top section covering radially distal portions of the notched cutters.

In accordance with another example embodiment, a saw or drill assembly may be provided where the saw or drill assembly employs a saw blade or core bit of an example embodiment.

BRIEF DESCRIPTION OF THE DRAWINGS

In the following description of preferred embodiments, reference will be made to the accompanying drawings, in which.

FIG. 2 shows a top view of a saw blade in accordance with an example embodiment;

FIG. 3 illustrates a cross section view of the blade in accordance with an example embodiment;

FIG. 5, which includes FIGS. 5A and 5B, shows how segments of the blade may be formed by joining multiple pieces of material in accordance with an example embodiment.

DESCRIPTION OF PREFERRED EMBODIMENTS

Figure 1:
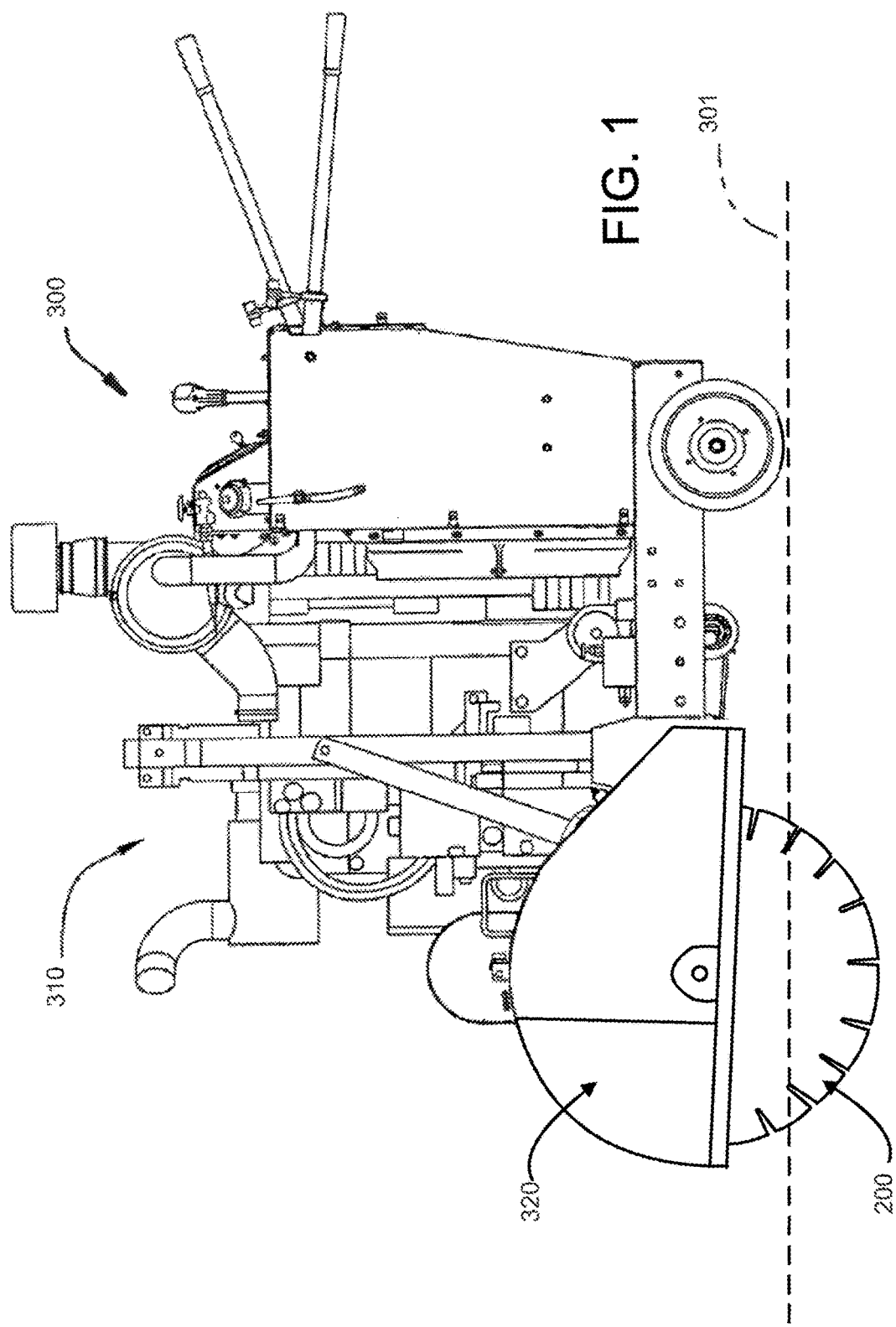
FIG. 1 shows a perspective view of mobile saw employing a blade of an example embodiment.

The present invention will be described more fully hereinafter with reference to the accompanying drawings, in which example embodiments of the invention incorporating one or more aspects of the present invention are shown. In the drawings, like numbers refer to like elements.

As discussed above, providing a straight or relatively smooth curved radius segment at the periphery of a saw blade typically means the blade will need to be operated at a lower speed. However, such a blade design is typically also relatively strong since metal or other objects encountered in material being cut may be less likely to damage the segments than a notched design. An example embodiment may therefore be employed to provide a strong blade that can also be employed at relatively high starting speed.

In this regard, some example embodiments may employ a steel core that supports a notched diamond-metal matrix cutting section for each of the segments of the saw blade. However, the notched diamond-metal matrix cutting section may be supported with an interlocking support assembly that extends in between and over peripheral ends of the notched diamond-metal matrix cutting section. The interlocking support assembly may include material to reinforce the notches, but may also provide a faster starting ability by having a fast starting diamond section that may be softer and/or include a lower concentration of diamond material therein. Thus, starting speed and strength can both be provided by example embodiments. However, example embodiments may also apply to core bits that may be designed in similar fashion for high speed operation with reinforced notched cutters. In this regard, the core bit may also be provided with a notched diamond-metal matrix cutting section that is supported with an interlocking support assembly that extends in between and over distal ends of the notched diamond-metal matrix cutting section. The interlocking support assembly may include material to reinforce the notches, but may also provide a faster starting ability by having a fast starting diamond section that may be softer and/or include a lower concentration of diamond material therein.

FIG. 1 shows an example of a saw that may employ blades of an example embodiment. In this regard, FIG. 1 illustrates a mobile saw assembly that may be transported on wheels or some other type of mobility assembly rather than being carried. Meanwhile, the mobile saw assembly may include a blade 200 of an example embodiment. The blade 200 may also or alternatively be employed on floor saws, road saws, wall saws, flat saws, early entry saws, span saws, masonry saws, stone saws, power cutters, hand held saws, ring saws and or the like that may be similarly utilized for cutting any concrete, masonry, stone or asphalt material. Thus, for example, the mobility assembly could include wheels (e.g., at least three wheels) that ride over the concrete surface. Alternatively, the saw could be mounted on a track, a stable platform or work station, be hand held, etc.

Referring now to FIG. 1, the mobile saw 300 may have a mobility assembly in addition to the motor 310 that rotatably drives the blade 200. The mobility assembly may carry the mobile saw 300 over a surface 301. The motor 310 may be a hydraulic, pneumatic, electric, battery-electric, or internal combustion engine. The blade 200 may be at least partially enclosed within blade guard 320. The saw 300 of FIG. 1 may employ the blade 200 of an example embodiment for either dry or wet cutting of concrete. Thus, for example, the saw 300 of example embodiments may be typically expected to cut concrete for road repair. However, other uses for the saw 300 may also be for cutting any concrete or asphalt surface including roads, inside commercial buildings, parking lots, cutting control joints in concrete, etc.

As shown in FIG. 1, the saw 300 may include the blade 200 of an example embodiment. Moreover, as described above, the blade 200 may be constructed to have a notched cutting portion fitted with an interlocking support assembly. By providing such a construction, the blade 200 may generally be capable of operating at higher starting speeds, but may be less susceptible to segment damage. Accordingly, the blade 200 may be enabled to effectively cut masonry and/or concrete without necessarily sacrificing starting speed.

Figure 4:
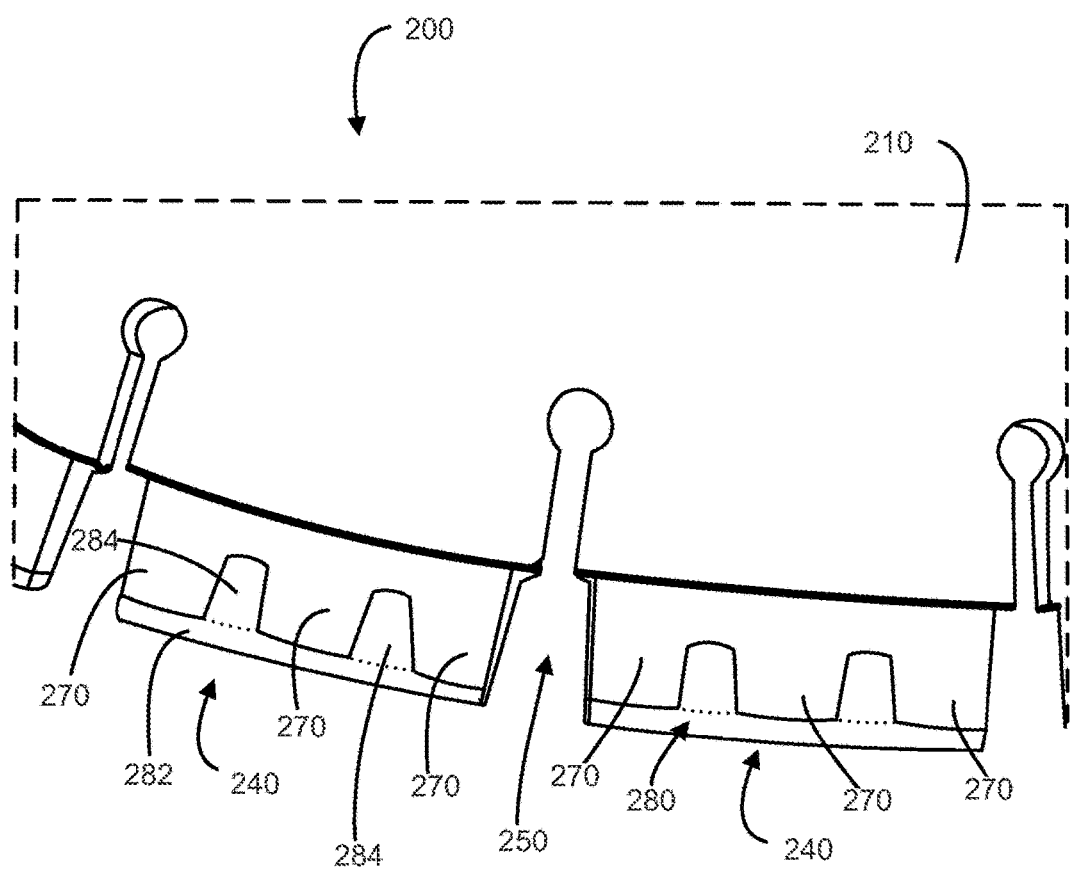
FIG. 4 shows a close-up, perspective view of a portion of the blade of FIG. 2 in accordance with an example embodiment.

FIG. 2 illustrates a top (or bottom) view of the blade 200 of an example embodiment. The view of FIG. 2 is from a perspective that is looking down the axis of the blade 200. Meanwhile, FIG. 3 illustrates a cross section view of a portion of the blade 200 where the cross section is cut along the axis. FIG. 4 illustrates a conceptual side view of two cutting segments of the blade 200 of FIG. 2. Meanwhile, FIG. 5 illustrates a perspective view of a portion of the blade 200 according to an example embodiment.

As shown in FIGS. 3 and 4, the blade 200 may include a main body 210 and a cutting portion 220. The main body 210 may be substantially plate shaped and may be defined as a flat body that extends radially outwardly from an arbor 230 of the blade 200 to the cutting portion 220. The main body 210 may be made of steel, or another suitably rigid metallic alloy. The arbor 230 may be an orifice that passes through a center of the main body 210. The arbor 230 may have any shape and may be configured to mate with a clamping device of the saw 300 to enable the blade 200 to be fixed in rotatable contact with the saw 300. The arbor 230 of this example embodiment is a 1 inch round arbor hole. However, other shapes and sized can be used in other examples.

The cutting portion 220 may be coaxial with the main body 210 and may be formed around the external periphery of the main body 210. The cutting portion 220 and the main body 210 may lie generally coplanar with each other such that the cutting portion 220 substantially forms an annular region covering most, or all, of the periphery (i.e., the radial edges) of the main body 210. The cutting portion 220 may be formed from a diamond-metal matrix to give the cutting portion 220 an appropriate diamond-metal composition to enable it to cut concrete, masonry or other such hard construction materials. The cutting portion 220 may be joined to the main body 210 such that the cutting portion 220 extends radially outwardly from the main body 210 to cut material responsive to rotation of the blade 200. The joint therebetween may be provided by laser welding, brazing, soldering, sintering, spot welding, gluing, or any other suitable method of adhesion.

In some cases, the cutting portion 220 may be slightly wider than the main body 210 in the axial direction, as shown in the cross section view of FIG. 3. Although not required, the cutting portion 220 may be divided into segments 240 that may be divided from each other by slots 250. The slots 250 may extend radially inwardly from the outer edges of the blade 200 and may be used to carry material out of the groove being cut when the blade 200 is employed.

The slots 250 may have any suitable length. However, for a typical example of the blade 200, which may have a diameter of about 4 inches to about 72 inches, the slot 250 (if employed) may be expected to have a length of between about 1/16 inch to about 3/4 inch. Although the cutting portion 220 could also have any suitable length including a length (in the radial direction) that is less than, equal to, or greater than the length of the slot 250, some example embodiments may employ a cutting portion length of about 1 inch to about 2 inches.

The slots 250 can take different shapes and may have various geometric features provided therein. In the example of FIG. 2, the slots 250 are generally rectangular in shape as then extend inwardly toward the main body 210, and they terminate in a circular gap. However, other shapes could alternatively be employed. It should also be appreciated that the slots 250, which are shown in FIG. 2 to pass entirely through the cutting portion 220 and into the main body 210, could alternatively terminate in the cutting portion 220.

In some cases, it may be desirable for the saw blade 200 to be able to cut with a higher starting speed. A fast starting ability may be provided by providing the cutting portion 220 with notched cutters 270, as shown in FIG. 4. The notched cutters 270 may be disposed around the periphery of the main body 210 and extend radially outwardly from the main body 210. The notched cutters 270 may be formed of powdered metal with diamond particles provided therein to form a diamond-metal matrix. The diamond-metal matrix may provide a surface of sufficient hardness to cut concrete and other masonry. However, because using a straight segment of the diamond-metal matrix would generate a substantial amount of frictional drag, providing the diamond-metal matrix with some portions removed to form the notched cutters 270 reduces the frictional drag and allows for a higher starting speed for the blade 200.

In some embodiments, each of the segments 240 may include two notches to form three protrusions that act as the notched cutters 270. Other numbers of notches (e.g., one or more than two) and other corresponding numbers of protrusions (e.g., two or more than three) may alternatively be employed in some embodiments. In any case, however, the protrusions may be weaker than a straight segment design. Thus, to improve the strength of the segments 240, while not greatly increasing frictional drag so as to continue to allow for a fast starting ability, some embodiments may employ an interlocking support assembly 280. The interlocking support assembly 280 may be provided radially outwardly of the notched cutters 270 and may include a different (e.g., a lower) diamond concentration than the diamond-metal matrix employed in the notched cutters 270. Thus, the interlocking support assembly 280 may be configured to increase the strength of the notched cutters 270 by providing support therebetween, but may also not substantially increase frictional drag of the cutting portion 220. To keep frictional drag substantially low, but also reinforce the notched cutters 270, the interlocking support assembly 280 may employ a material that is softer and/or has a lower diamond concentration than the notched cutters 270. In particular, for example, the interlocking support assembly 280 may include a reinforcement portion 284 disposed between the notched cutters 270 of a particular one of the segments 240 and a top section 282 that covers over radially distal portions of the notched cutters 270 and the reinforcement portions 284 therebetween.

FIG. 4 shows the arrangement discussed above in detail in relation to two adjacent segments 240. However, it should be appreciated that all of the segments 240 of FIG. 2 may be similarly formed. As such, for example, each of the segments 240 may include a high-concentration diamond-metal matrix that is formed from metallic powders that are relatively hard formed as adjacent teeth or projections with gaps therebetween. These teeth or projections form the notched cutters 270 described above (i.e., the notches correspond to the gaps between projections or teeth). Meanwhile, the diamond-metal matrix of the interlocking support assembly 280 may have a lower concentration of diamond particles and/or may employ metallic powders that are softer than those used in the notched cutters 270. In some cases, the top section 282 may have the same diamond concentration and metallic powder hardness as the reinforcement portions 284. However, in some embodiments, the metallic powder hardness and/or the diamond concentration of the reinforcement portions 284 may be lower than that of the top section 282. Moreover, in some embodiments, the reinforcement portions 284 may not have any diamond material therein. Thus, the reinforcement portions 284 may only serve a reinforcing function.

The notched cutters 270 may be formed as a separate cold pressed segment from the interlocking support assembly 280, which may be formed as its own separate cold pressed segment. Then the notched cutters 270 and the interlocking support assembly 280 may each be hot pressed into one segment (i.e., one of the segments 240). This arrangement is generally shown in FIG. 5 in which FIG. 5A illustrates the separate cold pressed notched cutters 270 and interlocking support assembly 280, respectively, and in which FIG. 5B shows the combined segment after hot pressing. Alternatively, the cold pressed segments may also be joined together via other sintering processes including sintering in a bell, conveyor, box or similar furnaces with or without pressure or vacuum applied, liquid phase sintering, etc. The softer interlocking support assembly 280 provides a fast cutting start and also reinforces the notched cutters 270.

Given the hardness differences in the materials, as described above, the interlocking support assembly 280 of some embodiments may be expected to wear away faster than the notched cutters 270. Thus, the blade 200 may begin its useful life having substantially the shape and structure shown in FIGS. 2 and 4. However, over time the top portion 282 may wear away first and then the reinforcement portions 284 may also wear away. Thus, at some point, the cutting portion 220 may be worn away to substantially represent only the outline of the notched cutters 270 before those fully wear away.

Of note, the shapes of the tops of the teeth of the notched cutters 270 are generally rectangular in FIGS. 4 and 5. However, any other shape could be employed in various alternatives. Similarly, the shapes of the reinforcement portions 284 could be different in some embodiments, based on the corresponding shapes of the notched cutters 270. In embodiments in which the top section 282 and reinforcement portions 284 are made of different materials, the top section 282 may generally have the same depth over each of the teeth portions of the notched cutters 270 and over the reinforcement portions 284. The top section 282 may extend over the entire length of the segment 240 correspondingly covering the notch cutters 270 and the reinforcement portions 284 around an outer periphery of the blade 200. Thus, the main body 210 may extend radially outward to form a substantially circular peripheral edge to which the cutting portion 220 is joined, and more specifically to which the notched cutters 270 of the cutting portion 220 are joined. The notched cutters 270 may be separated from each other by the reinforcement portions 284. Meanwhile, both the distal ends of the notched cutters and the reinforcement portions 284 may be covered by the top section 282 over the entire outer periphery of the blade 200, except at the slots 250. In some cases, the depth and/or length of the support section 284 can vary within a segment or from segment to segment around the perimeter of the blade 200.

Figure 6:
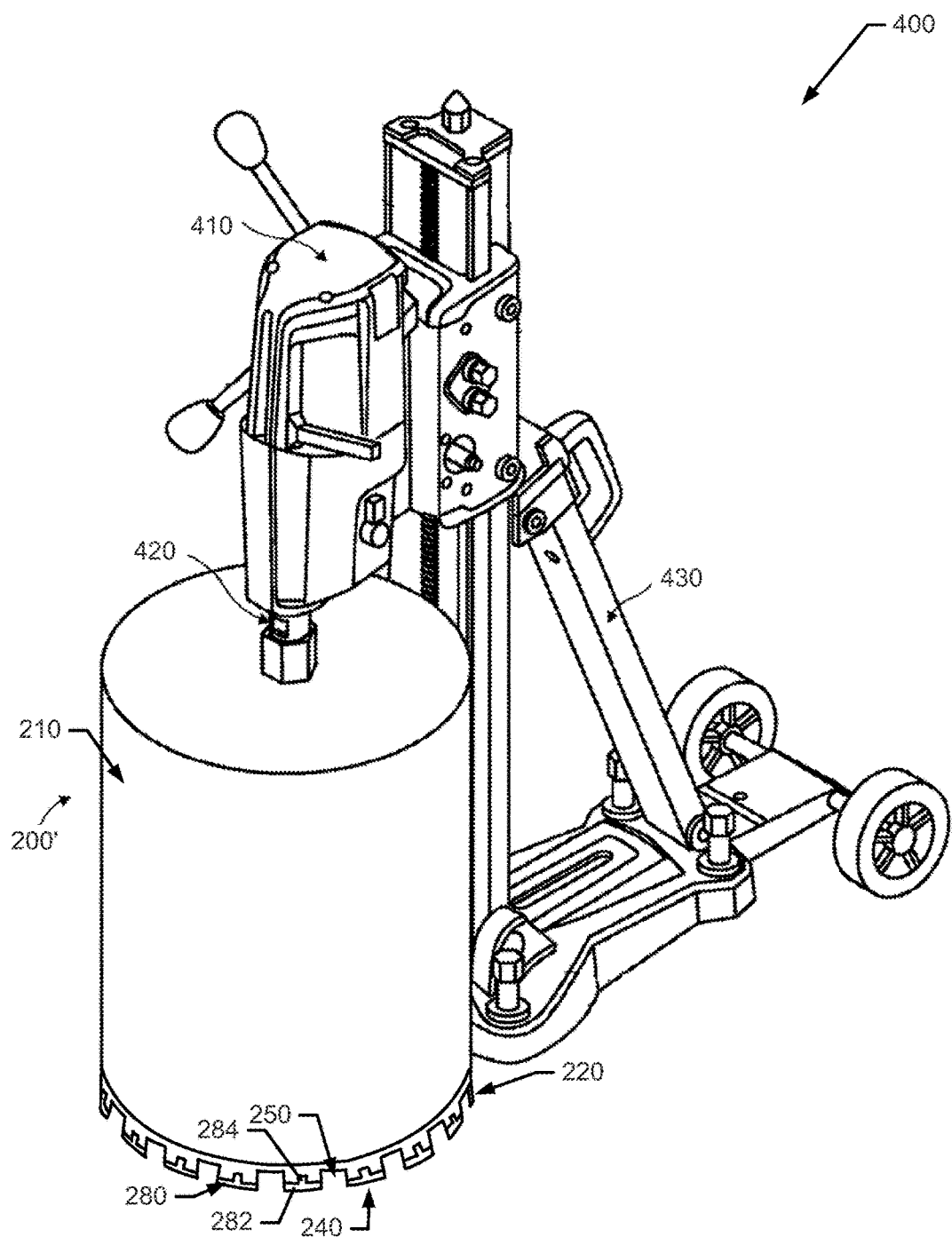
FIG. 6 illustrates a perspective view of a drill that may employ a core bit in accordance with an example embodiment.

As mentioned above, example embodiments may also be practiced in the context of cutting tools such as a core bit. FIG. 6 illustrates a drill assembly 400, which is another example of a cutting tool on which a cutting device of an example embodiment may be employed. The drill assembly 400 may include a motor 410 configured to turn a core bit 200', which is structured in accordance with an example embodiment. The core bit 200' may be structured similarly to the saw blade 200 described above except that the main body 210 of the core bit 200' has a hollow cylindrical shape instead of a plate shape. Thus, the cutting portion 220 of the core bit 200' extends outwardly from the main body 210 in-line with sidewalls of the main body 210 at a distal end of the main body 210. The core bit 200' is attached to the motor 410 via a chuck 420. The motor 410 may be supported by a drill stand 430. However, other structures for supporting the motor 410 and/or other portions of the drill assembly 400 may be provided in alternative embodiments. Responsive to operation of the motor 410, the main body 210 is rotated to engage the cutting portion 220 and the notched cutters 270 and interlocking support assembly 280 thereof with the material being cut.

As described above, the notched cutters 270 may be formed in segments 240 that are divided by slots 250. The notched cutters 270 may have a higher hardness and/or diamond concentration than the interlocking support assembly 280. The interlocking support assembly 280 may include the reinforcement portions 284 and top section 282 as described above. The interlocking support assembly 280 extends outwardly from the cutting portion 220 in-line with the main body 210 instead of in the same plane as the main body 210 as provided in the saw blade 200 example above.

Based on the descriptions and drawings provided above, it should be appreciated that a saw blade or core bit (i.e., a diamond cutting tool) for enabling a fast cutting start is provided. The tool may include a rotatable main body and a cutting portion, and may be employed on a saw or drill assembly including a motor for turning the cutting tool. The rotatable main body may include a substantially plate-like structure (for the blade embodiment) or a hollow cylindrical body (for the core bit embodiment) having a substantially circular periphery. The cutting portion may include an interlocking support assembly and a plurality of notched cutters. The notched cutters may be disposed around the circular periphery extending outwardly (radially or in-line) from the main body. The notched cutters may be formed of a first diamond-metal matrix. The interlocking support assembly may be provided outwardly (again, either radially or in-line) of the notched cutters and may include a different diamond concentration and/or metal matrix than the first diamond-metal matrix. The interlocking support assembly may include a reinforcement portion disposed between the notched cutters and a top section covering distal portions of the notched cutters.

The cutting tool of some embodiments may include additional features that may be optionally added either alone or in combination with each other. For example, in some embodiments, each of the features below may be individually added or added in combination with any or all of the other features described below. In this regard, in some cases, the main body may include a steel core, and the notched cutters may be affixed to the main body by welding, brazing, soldering, sintering, gluing or other adhesive agents. In an example embodiment, the cutting portion may be divided into a plurality of cutting segments divided by slots extending inwardly from an outer periphery of the blade toward an axis of the main body. Each of the cutting segments may include multiple notched cutters. In some examples, a hardness of the interlocking support assembly may be lower than a hardness of the notched cutters. In some embodiments, the top section may comprise a second diamond-metal matrix having a lower diamond concentration than the first diamond-metal matrix. In some cases, the reinforcement portion may include a third diamond-metal matrix having a lower diamond concentration than the first diamond-metal matrix and the second diamond-metal matrix. In an example embodiment, the top section may extend over two reinforcement portions and three notched cutters in each of the cutting segments. In some examples, the top section may have a lower hardness and/or a lower diamond concentration than the notched cutters. In some embodiments, the notched cutters may include a first cold pressed segment and the interlocking support assembly comprises a second cold pressed segment. In some cases, the first cold pressed segment and the second cold pressed segment may be hot pressed or sintered together to form the cutting portion.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

The invention claimed is:

1. A diamond cutting tool for enabling a fast cutting start, the tool comprising:
   a rotatable main body having a substantially circular periphery; and
   a cutting portion comprising:
      a plurality of notched cutters disposed around a portion of the circular periphery extending outwardly from the main body, the notched cutters being formed of a first diamond-metal matrix; and
      an interlocking support assembly provided outwardly of the notched cutters, the interlocking support assembly comprising a softer diamond-metal matrix or a different diamond concentration therein than the first diamond-metal matrix,
      wherein the interlocking support assembly includes a reinforcement portion disposed between the notched cutters and a top section covering radially distal portions of the notched cutters, wherein the notched cutters are separated from each other by the reinforcement portion.

2. The tool of claim 1, wherein the main body comprises a steel core, and the notched cutters are affixed to the main body by welding, brazing, soldering, sintering, gluing or other adhesive agents.

3. The tool of claim 1, wherein the cutting portion is divided into a plurality of cutting segments, the cutting segments divided by slots extending inwardly from an outer periphery of the blade toward an axis of the main body, each of the cutting segments including multiple notched cutters and multiple reinforcement portions.

4. The tool of claim 1, wherein a hardness of the interlocking support assembly is lower than a hardness of the notched cutters.

5. The tool of claim 1, wherein the top section has a second diamond-metal matrix having a softer diamond-metal matrix or a different diamond concentration than the first diamond-metal matrix.

6. The tool of claim 5, wherein the reinforcement portion comprises a third diamond-metal matrix having a lower diamond concentration or a softer diamond-metal matrix than the first diamond-metal matrix and the second diamond-metal matrix.

7. The tool of claim 1, wherein the top section extends over at least one reinforcement portion and at least two notched cutters in each of the cutting segments.

8. The tool of claim 1, wherein the top section has a lower hardness or a different diamond concentration than the notched cutters.

9. The tool of claim 1, wherein the notched cutters comprise a first cold pressed segment and the interlocking support assembly comprises a second cold pressed segment.

10. The tool of claim 9, wherein the first cold pressed segment and the second cold pressed segment are hot pressed or sintered together.

11. The tool of claim 1, wherein the main body comprises a substantially plate-like structure, wherein the interlocking support assembly is provided radially outwardly of the notched cutters, and wherein the tool comprises a saw blade.

12. The tool of claim 1, wherein the main body comprises a hollow cylindrical structure, wherein the interlocking support assembly is provided in-line with cylindrical walls of the main body and the notched cutters, and wherein the tool comprises a core bit.

13. A saw assembly comprising:
a motor; and
a saw blade comprising:
  a rotatable main body having a substantially circular periphery; and
  a cutting portion comprising:
    a plurality of notched cutters disposed around a portion of the circular periphery extending outwardly from the main body, the notched cutters being formed of a first diamond-metal matrix; and
    an interlocking support assembly provided outwardly of the notched cutters, the interlocking support assembly comprising a softer diamond-metal matrix or a different diamond concentration therein than the first diamond-metal matrix,
  wherein the interlocking support assembly includes a reinforcement portion disposed between the notched cutters and a top section covering radially distal portions of the notched cutters, wherein the notched cutters are separated from each other by the reinforcement portion.

14. A drill assembly comprising;
a motor; and
a core bit comprising:
  a rotatable main body having a substantially circular periphery; and
  a cutting portion comprising:
    a plurality of notched cutters disposed around a portion of the circular periphery extending outwardly from the main body, the notched cutters being formed of a first diamond-metal matrix; and
    an interlocking support assembly provided outwardly of the notched cutters, the interlocking support assembly comprising a softer diamond-metal matrix or a different diamond concentration therein than the first diamond-metal matrix,
  wherein the interlocking support assembly includes a reinforcement portion disposed between the notched cutters and a top section covering radially distal portions of the notched cutters, wherein the notched cutters are separated from each other by the reinforcement portion.

15. A diamond cutting tool comprising:
a rotatable main body having a substantially circular periphery; and
a cutting portion comprising:
  a plurality of notched cutters disposed around a portion of the circular periphery extending outwardly from the main body, the notched cutters being formed of a first diamond-metal matrix; and
  an interlocking support assembly provided outwardly of the notched cutters, the interlocking support assembly comprising a softer diamond-metal matrix or a different diamond concentration therein than the first diamond-metal matrix,
wherein the interlocking support assembly includes a reinforcement portion disposed between the notched cutters and a top section covering radially distal portions of the notched cutters, wherein the notched cutters are separated from each other by the reinforcement portion, and
wherein the notched cutters comprise a first cold pressed segment and the interlocking support assembly comprises a second cold pressed segment, the first cold pressed segment and the second cold pressed segment being hot pressed or sintered together to form a single segment with reinforcement portions and a top section extending over the notched cutters.

16. The tool of claim 1, wherein the top section has a uniform depth over each of the notched cutters.

17. The assembly of claim 13, wherein the top section has a uniform depth over each of the notched cutters.

18. The tool of claim 1, wherein the top section has a first edge and a second edge opposite from the first edge, wherein the first edge forms a periphery of the cutting portion, and wherein the reinforcement portion is disposed between the notched cutters and extends to the first edge of the top section.

19. The assembly of claim 13, wherein the top section has a first edge and a second edge opposite from the first edge, wherein the first edge forms a periphery of the cutting portion, and wherein the reinforcement portion is disposed between the notched cutters and extends to the first edge of the top section.

20. The tool of claim 1, wherein the cutting portion is divided into a plurality of cutting segments, each of the cutting segments including multiple notched cutters and multiple reinforcement portions, wherein the top section extends over a length of each of the cutting segments at a uniform depth.

* * * * *